Patented Mar. 18, 1952

2,589,707

UNITED STATES PATENT OFFICE 2,589,707

CHOLINE GALLATE AND ITS PREPARATION

John Korner, Pitman, N. J.

No Drawing. Application June 6, 1950,
Serial No. 166,558

5 Claims. (Cl. 260—501)

This invention relates to the choline salts of the benzene and hydroxy benzene carboxylic acids including the three hydroxy-benzene carboxylic acid commonly known as gallic acid, and is herein illustrated in some detail as embodied in choline gallate and processes for making it.

Choline is an extremely unstable material although in combination it forms an important part of biological structures, and has been found valuable in medicine.

Various salts of choline have been proposed for medical use but have proved too unstable to be satisfactory for ordinary use, although of recognized therapeutic value, as for producing gastrointestinal action, such as stimulation of secretion, of amplitude of contraction and peristalis, and such as enhanced secretory action, especially of salivary, sweat and lacrimal glands, and probably a valuable cardiovascular action, although without action on the uterus.

Uses of choline have been, in effect, limited to choline in ester form, but according to the present invention a stable benzene carboxylic salt or hydroxy benzene carboxylic acid salt is readily prepared pure and in a yield of over 50%, perhaps of 80%, and appears to produce the desired molecular salt.

According to one procedure free choline in solution is caused to combine with the added acid.

It is now found possible to prepare pure free choline by dissolving easily obtained pure choline hydrochloride in water, mixing it with freshly prepared washed silver oxide, and separating out the resulting silver chloride.

The free choline is then carefully titrated with added gallic acid. By keeping the free choline solution free from chlorine ions and nitrate ions, it is possible to titrate the added gallic acid to an exact neutral end point and obtain the pure choline gallate.

The silver oxide is easily prepared by dissolving silver nitrate in distilled water and adding a solution of alkali metal hydroxide, such as sodium hydroxide in equimolecular amount or slightly less to be sure no sodium hydroxide is present at the end of the reaction. 0.5% less than a mole of sodium hydroxide is safe.

The mixed solutions rapidly precipitate a slurry of brown-black silver oxide. This slurry is washed repeatedly to remove any sodium chloride or sodium hydroxide, and until the wash water gives no response to the Brucine (red color) sulfuric acid test for nitrate ions.

The silver oxide was mixed with a molar solution of choline hydrochloride, which precipitates silver chloride leaving free choline in solution, preferably using some excess of silver oxide.

The silver oxide was stirred for twelve hours or more with the choline chloride and filtered off after a few drops of the solution show no reaction with a solution of silver nitrate, and the free choline was neutralized with gallic acid by titration.

The silver oxide must be fresh to work efficiently and if an excess of silver oxide is used chlorine is wholly absent from the free choline solution, and the end point of the gallic acid reaction is clear, whereas the presence of the chlorine would obscure it.

When the following were used, the yield of choline gallate was 12.1 grams as opposed to a theoretical yield of 24 grams, with a sharp melting point of 178° C. and a molecular weight of 291.19, when precipitated and filtered off and recrystallized from isopropyl or other higher alcohol.

According to an alternative procedure one mole choline hydrochloride was dissolved in absolutely dry specially prepared 100% ethyl alcohol and an equimolecular amount of sodium hydroxide was separately dissolved in another but minimum lot of the same alcohol.

One solution was carefully introduced into the other precipitating sodium chloride which was filtered off, the mixing and filtering being effected with complete exclusion of air.

The solution contains a large proportion of free choline and some sodium hydroxide and some sodium chloride.

To this was added one mol of gallic acid free of water previously dehydrated and mixed with the choline containing solution while protected from water and air.

The mixture contained mixed sodium gallate and choline gallate.

Then the alcohol was evaporated off and the residue was the mixed salts. When separated by successive fractional treatment with different solvents the product choline gallate was 37.5% of the theoretical.

The choline gallate either pure or mixed with sodium gallate provides a stable, highly useful therapeutic source of choline instead of the known choline ester derivatives.

Having thus described one embodiment of the invention in some detail, what is claimed is:

1. Choline gallate.
2. The process of preparing choline gallate which consists in reacting free choline with free gallic acid.

3. The process of preparing pure choline gallate which consists in reacting choline chloride with silver oxide to remove the chlorine ion from the choline ion, separating the choline from the resulting silver chloride, and reacting the choline with its molecular equivalent of gallic acid.

4. The process of preparing pure choline gallate which consists in preparing silver oxide, reacting choline chloride with the fresh oxide to remove the chlorine ion from the choline ion, separating the choline from the resulting silver chloride, and reacting the choline with its molecular equivalent of gallic acid.

5. The process of preparing pure choline gallate which consists in reacting silver nitrate with almost equimolecular alkali metal hydroxide, washing the resulting silver oxide, reacting choline chloride with the fresh silver oxide in excess, separating the resulting free choline from the resulting silver chloride, and reacting the free choline with its molecular equivalent of gallic acid.

JOHN KORNER.

REFERENCES CITED

The following references are of record in the file of this patent:

UNITED STATES PATENTS

| Number | Name | Date |
|---|---|---|
| 2,486,177 | Korner | Oct. 25, 1949 |

FOREIGN PATENTS

| Number | Country | Date |
|---|---|---|
| 290,523 | Germany | Mar. 1, 1916 |
| 8,031 of 1914 | Great Britain | Oct. 30, 1919 |
| 571,294 | Germany | Feb. 27, 1933 |